E. D. BENJAMIN.
Wheel Plow.
No. 84,252.  Patented Nov. 24, 1868.
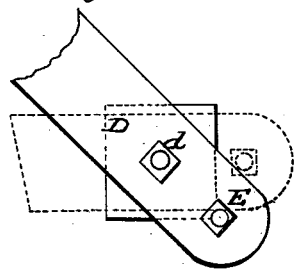
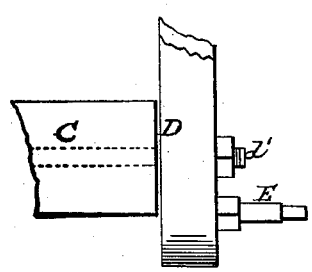
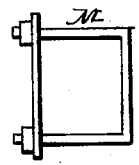
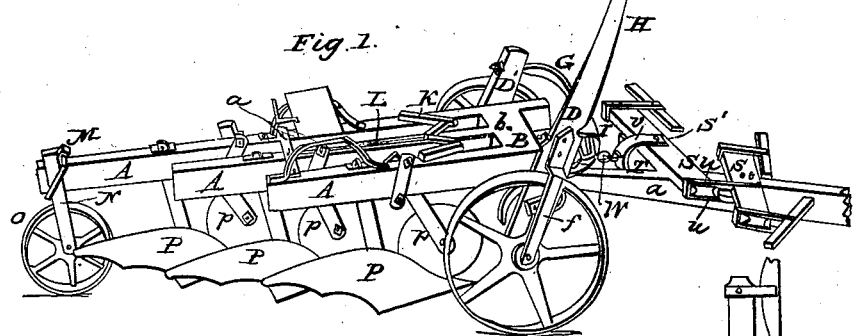
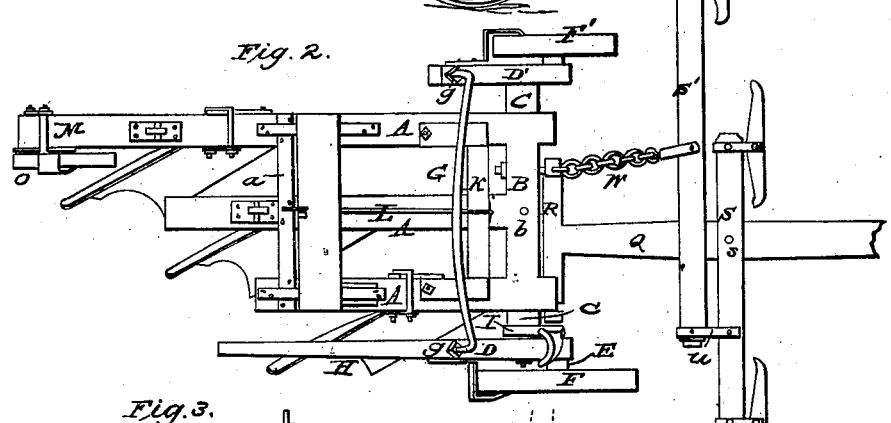
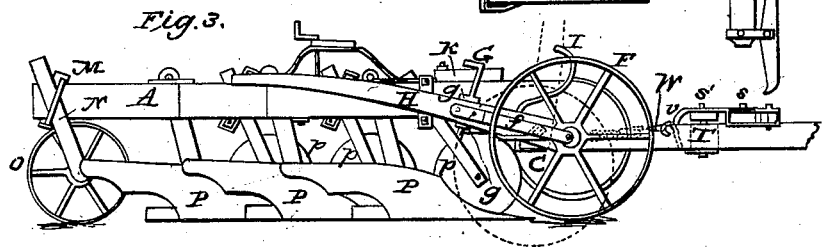
Witnesses.
Inventor.
Edward D. Benjamin

UNITED STATES PATENT OFFICE.

EDWARD D. BENJAMIN, OF OLD TOWN, ILLINOIS.

*Letters Patent No. 84,252, dated November 24, 1868.*

IMPROVEMENT IN PLOWS.

The Schedule referred to in these Letters Patent and making part of the same.

*To all whom it may concern:*

Be it known that I, EDWARD D. BENJAMIN, of Old Town, in the county of McLean, and State of Illinois, have invented certain new and useful Improvements in "Plows;" and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

Figure 1 is a perspective view of the plow;
Figure 2 is the plan, and
Figure 3, the side elevation of the same.
Figure 4 is the side elevation, and
Figure 5, the front elevation of lever-axle and axle-tree, and
Figure 6 is a yoke securing the regulating-wheel.

The nature of my invention consists in subdividing an ordinary twenty-four inch breaking-plow into several small breaking-plows, for the purpose of diminishing the drag and friction, and performing with three horses the same amount of work that is performed now with several yoke of cattle.

It consists also in two devices to set the plows in or to take them out of the ground; also in a regulating-wheel, to prevent the plows from going too far into the ground; also in a three-horse whiffle-tree, so arranged as to regulate the draught of the horses.

A A A are beams of different length, connected in front by cross-beam B, forming a bolster, and by iron plates, *a a*, behind. To this frame are attached breaking-plows, P P, and circular cutters, *p p*, both arranged in the same way as in ordinary breaking-plows, with this important difference, though, that they cut only eight inches (more or less,) thus subdividing the twenty-four-inch plow into several separate smaller plows, and diminishing the drag, resistance, and friction, to such an extent as to allow three horses only to cut the same amount of ground as the twenty-four-inch breaking-plow does, being dragged by several yoke of cattle.

Bolster B is connected to the axle-tree C by king-bolt *b*, and the levers D D' are bolted by bolts *d d'* to the ends of the axle-tree C, so as to pivot around the said bolts *d d'*. The short arms of said levers are provided with short iron axles, E E, on which wheels F F' are set, one wheel being larger than the other, the axles E E being connected, by braces *f f*, with the long arms of the levers D D', which arms are connected across by sway-bar G, passing over the frame of the plow, the bent ends of said sway-bar being arranged in the shape of bolts passing through the levers D D', and adjusted by the nuts *g g*.

One of the levers, D, is extended in the shape of a handle, H, to be worked by the driver, and to raise or lower the front end of the plow-frame, and to thus set the plows into or take them out of the ground, the axles E E serving, in this case, as the fulcrum.

Curved bar I serves as a rest to the sway-bar G and the handle H when the plow-frame is raised.

There is a folding frame, K, consisting of four pieces, hinged together, and lying on the top of the plow-beams, to which the ends of the outside pieces of the said folding frame are pivoted. Said frame is worked by a rod, L, and occupies, generally, a position as represented on fig. 2, on which frame the sway-bar G is resting when the plows are set in the ground, and are working, the wheel F following the furrow; but when a new field is to be marked off, or a hollow space has to be plowed, when it is necessary to set the plows deeper, then the folding frame is folded back, like on fig. 1, and the sway-bar G is resting on the beams, the front end of the plow-frame is thus lowered more, and the plows are brought down. The nuts *g g*, working on the bent end of the sway-bar G, serve also the purpose of raising or lowering the plows, and adjusting said depth to any desired degree.

To the rear end of the longest beam A of the plow-frame is strapped, by a yoke, M, the standard N of the regulating-wheel O, which wheel has the purpose to follow the furrow, and to keep the plows always at a certain depth, to which they are adjusted, without permitting them to wedge deeper into the ground.

The tongue Q is firmly connected with brace R, and this is securely connected with the axle-tree C by staples or swivel-eyes, so as to give to the connection some play vertically, and the draught of the horses is regulated by a double whiffle-tree, consisting of two pieces, S S', one pivoted to the tongue Q by the bolt *s*, and the other, by the bolt *s'*, to a block, T, connected with the said tongue by straps and pin, and swinging around. At the same time pieces S S' are connected by straps U U, pinned to said pieces, so that said pieces may shift between the said straps.

The block T and the piece S' bear a staple, V, to which chain W is attached, and is hooked into the staple or swivel-eye of the axle-tree. The length of piece S being three feet, or three-quarters of the length of the piece S', which is four feet long, and the bolt *s* being placed one foot from the inside end of the piece S, as also one foot from the point to which straps U U are attached, while bolt *s'* is situated right in the middle of the piece S', the consequence is that when the horses are attached to the plow, their work is equalized, so that one horse pulls as much as the other.

The frame, as above described, with the devices to raise or lower the plows, may be easily and suitably arranged for any gang-plow, to work in stubble-fields, &c.

The operation of the plow consists in this, that marking off a new field, the folding frame K is folded backward, and the sway-bar is brought to lie on the beams A A, and the nuts *g g* and regulating-wheel O are adjusted. When first furrows are made, the levers D D' are raised, the folding frame K is unfolded, and the sway-bar G is laid on the frame K, and the plow is started, in which operation the wheel F is following the furrow, and the wheel F' is running on the ground.

What I claim as my invention, and desire to secure by Letters Patent, is—

1. The combination of the whiffle-trees with the plow, when the same are constructed and arranged in connection therewith, in the manner herein shown and described.

2. The levers D D', pivoted to the ends of the axle-tree, and bearing wheel-axles E E, at the ends of their short arms, and having their long arms connected by the adjustable sway-bar G, the whole arranged and operating substantially as herein set forth and specified.

3. The folding frame K, arranged and operating as described, and for the purpose specified.

EDWARD D. BENJAMIN.

Witnesses:
J. B. TURCHIN,
N. K. KROEBER.